US009314947B2

(12) United States Patent
Moriarty et al.

(10) Patent No.: US 9,314,947 B2
(45) Date of Patent: Apr. 19, 2016

(54) ADHESIVES, REACTION SYSTEMS, AND PROCESSES FOR PRODUCTION OF LIGNOCELLULOSIC COMPOSITES

(75) Inventors: Christopher J. Moriarty, The Woodlands, TX (US); Sachchida N. Singh, Moorestown, NJ (US); Paul D. Coleman, The Woodlands, TX (US)

(73) Assignee: Huntsman International LLC, The Woodlands, TX (US)

( * ) Notice: Subject to any disclaimer, the term of this patent is extended or adjusted under 35 U.S.C. 154(b) by 235 days.

(21) Appl. No.: 12/600,876

(22) PCT Filed: May 22, 2008

(86) PCT No.: PCT/US2008/064459
§ 371 (c)(1),
(2), (4) Date: Nov. 19, 2009

(87) PCT Pub. No.: WO2008/144770
PCT Pub. Date: Nov. 27, 2008

(65) Prior Publication Data
US 2010/0168287 A1    Jul. 1, 2010

Related U.S. Application Data

(60) Provisional application No. 60/939,627, filed on May 23, 2007.

(51) Int. Cl.
| | | |
|---|---|---|
| *C08L 97/02* | (2006.01) |
| *B29C 43/36* | (2006.01) |
| *C08G 18/48* | (2006.01) |
| *C08G 18/64* | (2006.01) |
| *C08G 18/76* | (2006.01) |
| *C09J 175/08* | (2006.01) |
| *B29K 311/14* | (2006.01) |
| *B29C 70/44* | (2006.01) |
| *B29K 1/00* | (2006.01) |
| *C08L 61/28* | (2006.01) |
| *C08L 91/06* | (2006.01) |

(52) U.S. Cl.
CPC ........ *B29C 43/3642* (2013.01); *C08G 18/4837* (2013.01); *C08G 18/6492* (2013.01); *C08G 18/7664* (2013.01); *C08L 97/02* (2013.01); *C09J 175/08* (2013.01); *B29C 70/44* (2013.01); *B29K 2001/00* (2013.01); *B29K 2311/14* (2013.01); *C08L 61/28* (2013.01); *C08L 91/06* (2013.01)

(58) Field of Classification Search
CPC ............................ C08L 97/02; B29K 2311/14
USPC .................. 524/14; 156/315, 331.4
See application file for complete search history.

(56) References Cited

U.S. PATENT DOCUMENTS

| | | | | |
|---|---|---|---|---|
| 3,689,442 | A | * | 9/1972 | Taub .............................. 527/302 |
| 4,100,328 | A | * | 7/1978 | Gallagher ..................... 428/407 |
| 4,361,662 | A | * | 11/1982 | Gaul et al. ....................... 524/14 |
| 4,551,517 | A | * | 11/1985 | Herold et al. ................... 528/60 |
| 4,552,944 | A | * | 11/1985 | Kamiyama et al. ............. 528/55 |
| 4,608,407 | A | * | 8/1986 | Kerimis et al. .................. 524/14 |
| 4,780,101 | A | * | 10/1988 | Watanabe et al. ................ 8/192 |
| 4,833,182 | A | * | 5/1989 | Israel et al. ..................... 524/14 |
| 5,166,232 | A | * | 11/1992 | Muller et al. ................... 524/35 |
| 5,587,414 | A | | 12/1996 | Leenslag et al. |
| 5,674,568 | A | * | 10/1997 | Layton et al. .............. 427/389.9 |
| 5,703,258 | A | | 12/1997 | Blount |
| 5,810,956 | A | | 9/1998 | Tanis et al. |
| 6,288,200 | B1 | | 9/2001 | Jung et al. |
| 6,288,255 | B1 | | 9/2001 | Skinner |
| 6,376,582 | B1 | * | 4/2002 | Iwata et al. ..................... 524/14 |
| 6,635,695 | B2 | * | 10/2003 | Yoshida et al. ................. 524/13 |
| 6,692,670 | B2 | * | 2/2004 | Moriarty et al. .............. 264/123 |
| 6,750,310 | B1 | | 6/2004 | Skinner |
| 6,762,314 | B2 | | 7/2004 | Partridge et al. |
| 6,881,771 | B2 | * | 4/2005 | Haas et al. ...................... 524/14 |
| 6,908,875 | B2 | | 6/2005 | Skinner et al. |
| 7,056,415 | B2 | * | 6/2006 | Meckel ...................... 156/331.4 |
| 7,241,846 | B2 | * | 7/2007 | Roby ............................ 525/406 |
| 7,439,280 | B2 | * | 10/2008 | Lu et al. ........................ 523/122 |
| 2001/0035591 | A1 | * | 11/2001 | Moriarty et al. .............. 264/109 |
| 2002/0022674 | A1 | * | 2/2002 | Singh et al. ................... 521/131 |
| 2003/0047278 | A1 | * | 3/2003 | Mente et al. .................. 156/296 |
| 2003/0078310 | A1 | * | 4/2003 | Singh et al. ................... 521/131 |
| 2004/0146654 | A1 | * | 7/2004 | Moriarty ....................... 427/387 |

(Continued)

FOREIGN PATENT DOCUMENTS

WO    WO2005/058996    6/2005

*Primary Examiner* — Liam J Heincer
(74) *Attorney, Agent, or Firm* — Robert A. Diaz

(57) ABSTRACT

Adhesives, reaction systems, and processes for the production of lignocellulosic composites. The reaction system comprises a multi-component adhesive and a lignocellulosic substrate. The lignocellulosic substrate comprises a plurality of lignocellulosic adherends and is preferably a mass of wood particles. The multi-component adhesive comprises a multifunctional isocyanate, a hydrophilic polyahl, and an organotransition metal catalyst. The multi-component adhesive is characterized by being formulated into at least two mutually reactive chemical component streams. The process comprises the separate application of the mutually reactive chemical component streams of the multi-component adhesive to the lignocellulosic substrate, followed by forming and pressing the adhesive treated substrate under conditions appropriate for curing the adhesive and forming a lignocellulosic composite article. The adhesives, reaction systems, and processes are particularly well suited for the production of oriented strand board (OSB).

14 Claims, No Drawings

(56) References Cited

U.S. PATENT DOCUMENTS

| | | | |
|---|---|---|---|
| 2005/0027044 A1* | 2/2005 | Moriarty et al. | 524/13 |
| 2006/0276614 A1 | 12/2006 | Niemann | |
| 2006/0283548 A1 | 12/2006 | Singh et al. | |
| 2008/0312402 A1* | 12/2008 | Tulloch et al. | 528/51 |
| 2009/0092840 A1* | 4/2009 | Schlumpf et al. | 428/423.1 |

* cited by examiner

US 9,314,947 B2

ADHESIVES, REACTION SYSTEMS, AND PROCESSES FOR PRODUCTION OF LIGNOCELLULOSIC COMPOSITES

CROSS REFERENCE TO RELATED APPLICATIONS

This application is the National Phase of International Application PCT/US08/64459 filed May 22, 2008 which designated the U.S. and which claims priority to U.S. Provisional App. No. 60/939,627 filed May 23, 2007. The noted applications are incorporated herein by reference.

FIELD OF THE DISCLOSURE

The disclosure concerns adhesives, reactions systems, and processes for use in the manufacture of lignocellulosic composites.

BACKGROUND

The manufacture of compression molded composites from a mixture of wood chips or fibers and a polyisocyanate binder is well known. Isocyanate binders are excellent adhesives for the wood chips or fibers, but they require the use of high press temperatures during the manufacture of composite boards from these lignocellulosic particulate substrates. Press temperatures of greater than 400 F, often as high as 430 F or even higher, are often needed in order to achieve an effective cure of the adhesive in a reasonable period of time. There is a trade off between press temperature and residence time in the press. Lower press temperatures generally equate to longer residence times. Longer residence times are undesirable in industry because these reduce the throughput of the manufacturing process. High press temperatures require more energy and often cause undesirable amounts of VOC (volatile organic compounds) emissions from the substrate during pressing. In addition, the high temperatures often cause thermal damage to the composite boards, and, in some circumstances, even fires in the press. The high heat requirements tend to drive the moisture content of the end product (board) to undesirably low levels.

The types of polyisocyanate adhesives used in industrial practice are almost invariably isocyanates of the MDI series, usually polymeric MDI (which refers to various mixtures of diphenylmethane diisocyanates and higher molecular weight polymethylene polyphenyl polyisocyanate oligomers). These polyisocyanate adhesives represent an improvement over older types of adhesives, most notably phenol-formaldehyde (PF) type adhesives, in terms of the quality of the boards produced. Lignocellulosic composites produced using MDI adhesives are generally more resistant to moisture damage than similar boards made with PF resins. An additional advantage of MDI adhesives, which has made them increasingly attractive in the OSB (oriented strand board) industry, is greater moisture tolerance in the substrate. MDI adhesives, as opposed to PF resins, can often be used on wood substrates that have higher moisture content. PF resins require very high pressing temperatures for industrially practical press residence times. The widely used class of MDI polyisocyanates work best with wood substrates (chips and/or fibers, often referred to in the industry as "furnish") that have been pre-dried to a moisture content in the range of about 2 to 6% by weight. This still requires some pre-drying of the furnish, although generally not as much as for PF adhesives. Pre-drying uses large amounts of energy and requires an added step in the production process. It also requires additional apparatus and introduces a new class of hazard—dryer fires. It would be highly desirable in industrial practice to avoid the pre-drying step altogether, or at least to achieve further reductions in the amount of pre-drying that is needed.

Therefore, there is a strong need in the wood composites industry, particularly in the manufacture of pressed particulate wood composites such as oriented strand board (OSB), for adhesives that can be used on higher moisture content furnishes and will cure at lower press temperatures without a decrease in press throughput. It would be desirable to be able to use press temperatures less than 400 F, preferably 350 F or lower, without increasing press residence time. It would also be desirable to be able to use furnish with a moisture content greater than 6% by weight. An adhesive that can successfully meet all these needs has the potential to significantly reduce product costs by reducing energy consumption. Additional benefits include improved product quality, reduced emissions, and improved plant safety.

SUMMARY OF THE DISCLOSURE

One embodiment that meets the needs described above is a reaction system for the production of lignocellulosic composite articles. The reaction system comprises a multi-component adhesive and a lignocellulosic substrate. The lignocellulosic substrate preferably comprises a plurality of lignocellulosic adherents. More preferably, the lignocellulosic substrate consists essentially of a mass of lignocellulosic particles. The multi-component adhesive minimally comprises two mutually reactive components that are desirably applied to the lignocellulosic substrate as separate streams. The multi-component adhesive contains at least a polyfunctional isocyanate, a hydrophilic polyahl, and a catalyst. The catalyst preferably comprises at least one transition metal organometallic compound. The preferred transition metal organometallic compounds are capable of being used in admixture with the polyfunctional isocyanate. In order to provide for sufficient isocyanate compatibility at ambient temperatures, it is highly desirable that the catalyst be essentially free of alkali metal or alkaline earth metal compounds. It is further preferred that the catalyst be essentially devoid of other metal compounds capable of causing significant self-reactions of the polyisocyanate under ambient conditions, particularly tin compounds. A highly preferred class of catalysts is organic compounds of iron, particularly iron compounds with chelating ligands. A preferred class of hydrophilic polyahls are polyether polyols based exclusively or predominantly on ethylene oxide, wherein the oxyethylene segments make up greater than 50% of the weight of the polyol. The polyfunctional isocyanate desirably comprises one or more isocyanates of the MDI series. The preferred polyfunctional isocyanate consists essentially of one or more members of the MDI series, and is more preferably a mixture of one or more diphenylmethane diisocyanate isomers with one or more of the higher molecular weight oligomers of the MDI series (polymethylene polyphenyl polyisocyanates).

Another embodiment that meets the needs set fourth above is a process for the production of lignocellulosic composites. The process minimally comprises the following steps:
a) Providing a lignocellulosic substrate. The lignocellulosic substrate preferably comprises a plurality of lignocellulosic adherends. More preferably, the lignocellulosic substrate consists essentially of a mass of lignocellulosic particles.
b) Providing a multi-component adhesive comprising at least a polyfunctional isocyanate, a hydrophilic polyahl, and a catalyst. The multi-component adhesive minimally comprises two mutually reactive streams, but may optionally comprise more than two streams. The preferred compositions of the essential ingredients of the multi-component adhesive (the polyfunctional isocyanate, hydrophilic polyahl, and catalyst) are as discussed above.

c) Applying the separate and mutually reactive components of the multi-component adhesive to the lignocellulosic substrate, desirably as independent streams without any pre-mixing of the components, in amounts suitable for the production of a bonded lignocellulosic composite article.

d) Forming and pressing the adhesive treated lignocellulosic substrate under conditions suitable for curing the adhesive and production of a bonded lignocellulosic composite article.

e) Recovering the bonded lignocellulosic article.

In a highly preferred manifestation of this process embodiment, the catalyst is pre-mixed with the polyfunctional isocyanate and applied to the substrate as one reactive stream.

The hydrophilic polyol is applied to the substrate as a second reactive stream. In the preferred manifestations of the process, the multicomponent adhesive is applied to the lignocellulosic substrate as exactly two mutually reactive chemical streams.

Another embodiment comprises adhesives for use in the manufacture of lignocellulosic composites. The multi-component adhesive minimally comprises two mutually reactive components that are desirably applied to the lignocellulosic substrate as separate streams. The multi-component adhesive comprises a polyfunctional isocyanate, a hydrophilic polyahl, and a catalyst. The catalyst preferably comprises at least one transition metal organometallic compound. The preferred transition metal organometallic compounds are capable of being used in admixture with the polyfunctional isocyanate. In order to provide for sufficient isocyanate compatibility at ambient temperatures, it is highly desirable that the catalyst be essentially free of alkali metal or alkaline earth metal compounds. It is further preferred that the catalyst be essentially devoid of other metal compounds capable of causing significant self-reactions of the polyisocyanate under ambient conditions, particularly tin compounds. A highly preferred class of catalysts is organic compounds of iron, particularly iron compounds with chelating ligands. A preferred class of hydrophilic polyahls are polyether polyols based exclusively or predominantly on ethylene oxide, wherein the oxyethylene segments make up greater than 50% of the weight of the polyol. The polyfunctional isocyanate desirably comprises one or more isocyanates of the MDI series. The preferred polyfunctional isocyanate consists essentially of one or more members of the MDI series, and is more preferably a mixture of one or more diphenylmethane diisocyanate isomers with one or more of the higher molecular weight oligomers of the MDI series (polymethylene polyphenyl polyisocyanates).

It has been unexpectedly and surprisingly found that the adhesives, reaction systems, and processes facilitate the production of pressed lignocellulosic composites, especially composites formed from a mass of particulate lignocellulosic furnish, at lower press temperatures without an increase in residence time in the press. It has further been found, quite unexpectedly, that the adhesives, reaction systems, and processes facilitate the production of lignocellulosic composites from relatively high moisture content furnish. Furnish having moisture content greater than 6% by weight can be used, and pressing can be accomplished at press temperatures of 350 F or lower. The adhesives, reaction systems, and processes are particularly well suited to the production of oriented strand board (OSB).

DETAILED DESCRIPTION

Adhesives for use in the manufacture of lignocellulosic composites are disclosed. The adhesive comprises two mutually reactive components that are desirably applied to the lignocellulosic substrate as separate streams. The multi-component adhesive comprises a polyfunctional isocyanate, a hydrophilic polyahl, and a catalyst. The catalyst preferably comprises at least one transition metal organometallic compound. The preferred transition metal organometallic compounds are capable of being used in admixture with the polyfunctional isocyanate. In order to provide for sufficient isocyanate compatibility at ambient temperatures, it is highly desirable that the catalyst be essentially free of alkali metal or alkaline earth metal compounds. It is further preferred that the catalyst be essentially devoid of other metal compounds capable of causing significant self-reactions of the polyisocyanate under ambient conditions, particularly tin compounds. A highly preferred class of catalysts are organic compounds of iron, particularly iron compounds with chelating ligands. A preferred class of hydrophilic polyahls are polyether polyols based exclusively or predominantly on ethylene oxide, wherein the oxyethylene segments make up greater than 50% of the weight of the polyol. The polyfunctional isocyanate desirably comprises one or more isocyanates of the MDI series. The preferred polyfunctional isocyanate consists essentially of one or more members of the MDI series, and is more preferably a mixture of one or more diphenylmethane diisocyanate isomers with one or more of the higher molecular weight oligomers of the MDI series (polymethylene polyphenyl polyisocyanates).

Reaction systems for the preparation of adhesively bonded lignocellulosic composite articles are disclosed. The reaction system comprises a multi-component adhesive and a lignocellulosic substrate. The lignocellulosic substrate desirably comprises a plurality of lignocellulosic adherends. More preferably, the lignocellulosic substrate consists essentially of a mass of lignocellulosic particles, such as wood chips and/or wood fibers. These particles are small in relation to the final compression molded lignocellulosic composite article, typically having a maximum length in any direction of less than six inches. In a particularly preferred application, such as the production of oriented strand board (OSB), the substrate consists essentially of a mass of flat wood chips each typically having a maximum length of less than six inches, width less than three inches, and thickness of about a half inch or less. The wood chips are typically irregular in size and shape.

The multi-component adhesive minimally comprises two mutually reactive components which are desirably applied to the lignocellulosic substrate as separate streams (separate chemical components). The multi-component adhesive comprises a polyfunctional isocyanate, a hydrophilic polyahl, and a catalyst.

The polyfunctional isocyanate is most typically an aromatic polyisocyanate. The aromatic polyisocyanates most widely used as adhesives in the manufacture of pressed lignocellulosic composites are MDI series polyisocyanates, most typically polymeric MDI. Polymeric MDI is a liquid mixture of several diphenylmethane diisocyanate isomers and higher functionality polymethylene polyphenyl isocyanates of functionality greater than 2. These isocyanate mixtures usually contain about half, by weight, of the higher functionality species. The remaining diisocyanate species present in polymeric MDI are typically dominated by the 4,4'-MDI isomer, with lesser amounts of the 2,4' isomer and traces of the 2,2' isomer. Polymeric MDI is the phosgenation product of a complex mixture of aniline-formaldehyde condensates. It typically contains between 30 and 34% by weight of isocyanate (—NCO) groups and has a number averaged isocyanate group functionality of from 2.6 to 3.0.

It is however within the scope of the disclosure to use any polyfunctional organic isocyanate adhesive. Non-limiting examples of other types of polyfunctional isocyanates that may be used include one or more members selected from the group consisting of aliphatic, araliphatic, aromatic, and heterocyclic polyisocyanates having number averaged isocyanate (—NCO) group functionalities of 2 or greater and organically bound isocyanate group concentrations of from about 1% by weight to about 60% by weight. The range of polyisocyanates that may be used includes prepolymers, pseudoprepolymers, and other modified variants of monomeric polyisocyanates known in the art that contain free reactive organic isocyanate groups. The preferred polyfunctional isocyanates are liquid at 25 C; have viscosities at 25 C of less than 10,000 cps, more preferably less than 5000 cps; and have concentrations of free organically bound isocyanate groups of from 10 to 33.6% by weight. The most preferred polyisocyanates are the MDI series isocyanates. The more preferred MDI series isocyanates include polymeric MDI and prepolymers, variations, or derivatives thereof that are known in the art. A particularly preferred class of MDI series isocyanates are those that are essentially free of prepolymers, containing less than 1% by weight, more preferably less than 0.1% by weight, and optimally 0% of prepolymerized species. Members of this particularly preferred class of MDI series isocyanates have concentrations of free organically bound isocyanate groups of from 31 to 32% by weight, number averaged isocyanate (NCO) group functionalities of from 2.6 to 2.9, and viscosities at 25 C of less than 1000 cps.

The multi-component adhesive also contains at least one hydrophilic polyahl. The term "polyahl" denotes an organic polyfunctional active hydrogen compound. The hydrophilic polyahl is most preferably an organic polyol wherein the isocyanate reactive active-hydrogen functional groups present consist essentially of primary and/or secondary organically bound hydroxyl groups; although other isocyanate-reactive functional groups may optionally be used. In preferred embodiments, the predominant isocyanate-reactive active-hydrogen groups present in the hydrophilic organic polyahl composition, on a molar basis, are organically bound primary and/or secondary hydroxyl groups. In a particularly preferred embodiment, the only isocyanate-reactive active-hydrogen groups present in the hydrophilic organic polyahl composition are organically bound primary and/or secondary hydroxyl groups. Primary organically bound hydroxyl groups are most preferred. In an embodiment, the mole ratio of primary organically bound hydroxy groups to secondary organically bound hydroxyl groups present in the hydrophilic polyahl composition is greater than 1:1, more preferably greater than 2:1, still more preferably greater than 4:1, and most preferably greater than 9:1.

Non limiting examples of suitable alternative isocyanate-reactive active-hydrogen functional groups that may be employed in the hydrophilic polyahl composition, either in addition to or instead of the primary and/or secondary organically bound hydroxyl groups, include one or more members selected from the group consisting of primary and secondary organically bound amine groups. Combinations of different polyahls may optionally be used. The polyahl contains two or more isocyanate-reactive active-hydrogen groups per molecule. The hydrophilic polyahl has some degree of water compatibility. Preferred hydrophilic polyahls are water miscible in all proportions. A particularly preferred class of hydrophilic polyahls is aliphatic polyether polyols that contain ethylene oxide (oxyethylene) units. The more preferred hydrophilic polyether polyahls of this class have an oxyethylene content of greater than 50% by weight, still more preferably greater than 70% by weight. The preferred hydrophilic polyahl has an isocyanate-reactive active-hydrogen group functionality, on a number averaged basis, of from 2 to 10, preferably 2 to 8, more preferably 2 to 6, still more preferably 3 to 5, and even more preferably 3 to 4. Triols are most preferred. Mixtures of different hydrophilic polyahls may be used if desired. Individual polyahls that contain combinations of different types of isocyanate-reactive active-hydrogen groups, such as hydroxyl groups and primary and/or secondary amine groups in the same molecule, may be used if desired. The total functionality of such mixed functionality polyahls is understood to be the sum of the individual isocyanate-reactive active-hydrogen group functionalities.

The organic hydrophilic polyahl(s) may optionally be used in combination with one or more monofunctional organic active hydrogen species, such as mono-ols or mono-amines that contain no other isocyanate-reactive active-hydrogen groups, and the like. The presence of such monofunctional organic active hydrogen species should preferably be avoided or minimized.

The molecular weight (number averaged) of the hydrophilic organic polyahl is desirably between about 300 and 10,000, but is more preferably between 400 and 6000, still more preferably between 600 and 4000, even more preferably between 700 and 2000, and most preferably from 800 to 1500. The preferred polyether polyols are typically prepared by methods well known in the art such as the addition of one or more types of alkylene oxides onto one or a combination of polyfunctional initiators. The most preferred alkylene oxide is ethylene oxide, but other types of alkylene oxides may optionally be used (preferably in minor amounts) with ethylene oxide. Non limiting examples of optional alkylene oxides include propylene oxide, butylene oxide, oxides of higher aliphatic alpha olefins, oxides of aromatic alpha olefins such as styrene oxide, and combinations of these. Non limiting examples of suitable polyfunctional initiators include ethylene glycol, water, 1,2-propanediol, 1,3-propanediol, 1,4-butanediol, 1,3-butanediol, glycerol, 1,1,1-trimethylolethane, 1,1,1-trimethylolpropane, pentaerythritol, sorbitol, glucose, sucrose, triethanolamine, triisopropanolamine, ethylene diamine, ethanolamine, any of the isomers of toluene diamine, 4,4'-diaminodiphenylmethane, 2,4'-diaminodiphenylmethane, bisphenol-A, any of the isomers of dihydroxybenzene, and combinations of these. Water soluble initiators are more preferred, and fully water miscible initiators are even more preferred. A particularly preferred initiator is glycerol.

Non-limiting examples of suitable hydrophilic polyether polahls include ethylene oxide adducts of glycerol, ethylene oxide adducts of trimethylolpropane, ethylene oxide and propylene oxide adducts of glycerol wherein the oxyethylene content is greater than 50% by weight, ethylene oxide and propylene oxide adducts of trimethylolpropane wherein the oxyethylene content is greater than 50% by weight, ethylene oxide and butylene oxide adducts of glycerol and/or trimethylolpropane wherein the oxyethylene content is greater than 50% by weight, and mixtures of these. If more than one alkylene oxide is used the distribution may be random, block, or any combination thereof. Mixtures of different polyether polyols may be used, but it is highly preferred that the total oxyethylene content of such mixtures be greater than 50% by weight, preferably 70% by weight or greater, of the weight of the mixture.

The multi-component adhesive according to the invention may optionally be applied to the substrate in combination with known non-isocyanate type adhesives, but is more typically applied to the substrate alone. Typical total adhesive loadings (including all components of the multi-component adhesive according to the invention, plus any optional non-isocyanate type adhesives which may be used) range from about 1 to about 6% by weight of the lignocellulosic substrate, more commonly from about 1.5 to about 4%.

The multi-component adhesive additionally contains a catalyst. The catalyst desirably comprises at least one transition metal organometallic compound. In a preferred embodiment, the catalyst consists essentially of one or more transition metal organometallic compounds. The preferred transition metal organometallic compounds contain one or more metals selected from the group consisting of the metals of Groups IVB, VB, VIIB, VIIB, and VIIIB of the Periodic Table of the Elements. A more preferred class of transition metal organometallic compounds suitable for use as catalysts in the reaction system contain one or more metals selected from the group consisting of the metals of Group VIIIB of the Periodic Table. Organometallic compounds of iron are particularly preferred. The transition metal organometallic catalysts preferably contain one or more chelating ligands. Non limiting examples of chelating ligands include acetylacetone, alkyl or aryl acetoacetate esters, gluconate, cyclopentadienyl, and combinations thereof. Acetylacetone (AcAc) and the acetoacetates are examples of preferred chelating ligands. One class of particularly preferred organometallic catalysts suitable for use in the reaction systems of the invention are those described in the following US patents, which are incorporated herein fully by reference: U.S. Pat. No. 5,587,414, U.S. Pat. No. 6,288,200, U.S. Pat. No. 6,908,875, U.S. Pat. No. 6,750,310, U.S. Pat. No. 6,288,255, and U.S. Pat. No. 6,762,314.

The most preferred transition metal organometallic compounds are capable of being used in admixture with the polyfunctional isocyanate. In order to provide for sufficient isocyanate compatibility of the catalyst at ambient temperatures, and to avoid instabilities due to undesired self-reactions of the isocyanate prior to its use or during the application process, it is highly desirable that the catalyst be essentially free of alkali metal or alkaline earth metal compounds. It is further preferred that the catalyst be essentially devoid of other metal compounds capable of causing significant self-reactions of the polyisocyanate under ambient conditions, particularly tin compounds. By "significant self-reactions" it is meant reactions of the isocyanate groups with other isocyanate groups and/or other chemical groups present in the polyfunctional isocyanate composition that are sufficient to interfere with the use of the polyfunctional isocyanate or the storage thereof at ambient (room) temperature conditions under dry air for at least 24 hours, preferably at least 1 week, more preferably at least 2 week, still more preferably for at least 4 weeks, even more preferably for at least 60 days, and most preferably for at least 180 days. Desirably, the free isocyanate (—NCO) content of the polyfunctional isocyanate, expressed on a percent by weight basis, should not change by more than one percentage point during storage or use prior to its application to the substrate. By "essentially free" and "essentially devoid" it is meant that the total catalyst composition contains less than 10% by weight in total (relative to the total catalyst composition weight) of all these destabilizing compounds, more preferably less than 1%, still more preferably less than 0.5%, even more preferably less than 0.1%, and most preferably less than 0.01% by weight. Ideally, there should be no detectable amounts of these compounds present in the catalyst composition.

Combinations of different organotransition metal catalysts may be used if desired. The preferred organotransition metal catalysts may, if desired, be used in combination with traditional urethane catalysts such as tertiary amines. When the catalyst is intended to be used in direct contact with the polyfunctional isocyanate the types of tertiary amines present, if any, and their levels should be adjusted to provide for sufficient stability of the isocyanate, as indicated above. In preferred embodiments, the organotransition metal catalysts are the sole catalysts used in the multi-component adhesive system.

The catalyst, or catalysts, may be employed in the reaction system as one or more separate streams, may be used in combination with one or more of the other components of the multi-component adhesive, or any combination of these alternatives. In preferred embodiments of the reaction system, at least one transition metal organometallic compound is mixed into the polyfunctional isocyanate. It is within the broader scope, although generally less preferred, to use optional additional catalysts such as tertiary amines in combination with the hydrophilic polyahl, as separate streams, or any combination thereof.

In the more preferred embodiments of the reaction system, the multi-component adhesive consists of exactly two mutually reactive components: a polyfunctional isocyanate stream comprising at least one transition metal organometallic catalyst, and a second stream comprising at least one hydrophilic polyahl. The hydrophilic polyahl is desirably the principle ingredient by weight of the second stream. The polyfunctional isocyanate is desirably the principle ingredient by weight of the first stream.

The multi-component adhesive may optionally also contain other ingredients in addition to the polyfunctional isocyanate, catalyst, and hydrophilic polyol. Other kinds of known optional additives may be employed. Non-limiting examples of the optional additives that may be used include fire retardants, such as tris-(chloropropyl) phosphate (TCPP), triaryl phosphates such as triphenyl phosphate, melamine, melamine resins, and graphite; pigments; dyes; antioxidants such as triaryl phosphites (ie. triphenyl phosphite), and hindered phenols (ie. BHT, BHA, etc.); light stabilizers; expanding agents; inorganic fillers; organic fillers (distinct from the lignocellulosic material used in the substrate); smoke suppressants; slack waxes (liquid or low melting hydrocarbon waxes); antistatic agents; internal mold release agents, such as soaps, dispersed solid waxes, silicones, and fatty acids; inert liquid diluents, especially non-volatile diluents such as triglyceride oils (soy oil, linseed oil, and the like); solvents, especially the relatively non volatile solvents such as propylene carbonate; biocides such as boric acid; combinations of these; and the like. The methods for using these and other known optional additives and the specific instances and appropriate amounts thereof will be well understood by those skilled in the art. These optional additives may, if desired, by used in whole or in part as separate component streams. In preferred embodiments, these optional ingredients, when used, are formulated into the two stream system discussed above.

The lignocellulosic raw material, typically in the form of small chips, fibers, particles, or mixtures of these, is pre-treated with the components of the multi-component adhesive and tumbled in a blender in order to insure adequate distribution of the adhesive over the raw substrate. The adhesive treated lignocellulosic raw material is then pre-formed into a very loose mass prior to pressing. The relative amounts of the various ingredients in the multi-component adhesive, as applied to the substrate, may vary considerably. In most embodiments, the ratio of the number isocyanate (—NCO) groups to the total number of isocyanate-reactive active-hydrogen groups in the multi-component adhesive is between 1:40 and 40:1. In preferred embodiments, this ratio of equivalents of mutually reactive functional groups is between 1:20 and 20:1, more preferably between 1:10 and 10:1, and still more preferably between 1:5 and 5:1. The weight ratios of the various components of the multi-component adhesive are adjusted in order to provide the desired ratio of mutually reactive functional groups.

The amount of the catalyst(s) used in the multi-component adhesive system may vary considerably depending upon the type(s) of catalyst(s) used, the desired cure conditions, and the desired residence time in the press (cure time). Optimization of catalyst levels in order to achieve minimum cure times for a desired set of cure conditions will be understood by those skilled in the art. Guidance on the selection and use of transition metal organometallic catalysts can be found in the six patent references cited previously and in the examples provided below.

Also provided is a process for the production of lignocellulosic composites. The process employs the reaction system described above. The process comprises the following steps:
a) Providing a lignocellulosic substrate.

The lignocellulosic substrate preferably comprises a plurality of lignocellulosic adherends. More preferably, the lignocellulosic substrate consists essentially of a mass of lignocellulosic particles.

In optional embodiments of the process, the lignocellulosic particles, such as wood chips and/or wood fibers, may be combined with other particulate materials for incorporation into the final compression molded composite. Non-limiting examples of other particulate materials that may be used in this optional embodiment include carpet scrap, shredded non-metallic automotive wastes such as foam scrap and fabric scrap (sometimes referred to collectively as "light fluff"), particulate plastics wastes, inorganic or organic fibrous matter, combinations of these materials, and like materials. In the preferred embodiments of the process, the substrate is solely lignocellulosic particulate material, most preferably wood chips of the type used in the manufacture of oriented strand board (OSB). The types of lignocellulosic materials generally preferred include wood particles and fibers, but other types of lignocellulosic materials may optionally be used either alone or in combination with the wood based material. Non-limiting examples of alternative lignocellulosic materials suitable for use in the process include agricultural by-products such as straw, baggasse, hemp, jute, and like materials; waste paper products and paper pulp; combinations of these; and the like.
b) Providing a multi-component adhesive comprising at least a polyfunctional isocyanate, a hydrophilic polyahl, and a catalyst.

The multi-component adhesive minimally comprises two mutually reactive streams, but may optionally comprise more than two streams. The preferred compositions of the essential ingredients of the multi-component adhesive (the polyfunctional isocyanate, hydrophilic polyahl, and catalyst) as well as the absolute and relative amounts of these ingredients in the reaction system are as discussed above. In highly preferred embodiments, the multi-component adhesive system is formulated into exactly two mutually reactive chemical streams (components). The streams are preferably both liquids under the conditions of use, although it is within the scope to use one or more solid components. In a particularly preferred embodiment, one component (referred to herein as the first component) contains the polyfunctional isocyanate with the transition metal organometallic catalyst(s) dissolved or dispersed therein. The organometallic catalyst(s) is preferably soluble in the isocyanate and used in fully dissolved form therein. The opposing (second) component, in this preferred embodiment, contains the hydrophilic polyahl and any optional additives.
c) Applying the separate and mutually reactive components of the multi-component adhesive to the lignocellulosic substrate, desirably as independent streams without any pre-mixing of the components, in amounts suitable for the production of a bonded lignocellulosic composite article.

In preferred embodiments of the process, the mutually reactive components of the multi-component adhesive are applied to the substrate (particulate mass) separately from each other. This is preferably done by using separate ports, nozzles, or disks to distribute the streams. In this preferred embodiment, the mutually reactive streams of the multi-component adhesive do not contact each other to any significant degree until after they are on the surface of the substrate. Although generally less preferred, it is within the broader scope of the invention to pre-mix the mutually reactive components of the adhesive, in whole or in part, prior to the application thereof onto the substrate. However, when this pre-mixing mode is carried out it is desirable that the mutually reactive streams of the multi-component adhesive remain separate until just before the adhesive blend is applied to the substrate. Preferably, any blending of the mutually reactive streams should take place within two (2) minute of the application of the adhesive to the substrate, more preferably within one (1) minute, and even more preferably within 30 seconds or less of the application of the adhesive to the substrate. It is desirable to minimize or prevent reaction between the mutually reactive streams until the adhesive is in physical contact with the substrate. When the pre-mixing mode of the process is conducted, the mutually reactive chemical streams may be combined by means of a point-of-use mixing apparatus such as a static mixer or impingement mixing device. Regardless of whether the streams are pre-mixed or applied separately to the substrate, the distribution apparatus should preferably provide means, such as metering pumps, for controlling both the relative amounts of the streams and the absolute amount of adhesive applied to the substrate. The distribution apparatus should provide for wide and even coverage of the substrate with the adhesive, or the mutually reactive chemical components thereof. Devices such as spray heads or spinning disks typically used in the composite wood industry are suitable. Other types of distribution apparatus may be used if desired. Whatever type of distribution apparatus is used, it is preferable that it should provide some degree of atomization of the chemical streams during the application thereof to the substrate.

In preferred embodiments of the process, a particulate lignocellulosic substrate, such as a mass of wood chips, is tumbled in a blending apparatus during or immediately after the application of the multi-component adhesive. A rotating blender may be used as in the current state of the art. The tumbling helps provide for an even distribution of the adhesive over all surfaces of the lignocellulosic particles. Application of the multi-component adhesive while tumbling the lignocellulosic particulate substrate is particularly preferred.

Whatever the mode of application used, there should be no significant reaction between the mutually reactive chemical component streams of the multi-component adhesive before they are on the surface of the lignocellulosic substrate. By "no significant reaction" it is meant that less than 10 mole percent, preferably less than 5 mole percent, more preferably less than 1 mole percent, still more preferably less than 0.5 mole percent, and most preferably less than 0.1 mole percent of the free isocyanate (—NCO) groups present in the original multi-component adhesive formulation are consumed by reaction between the mutually reactive component streams before said streams are in contact with the lignocellulosic substrate.

d) Forming and pressing the adhesive treated lignocellulosic substrate under conditions suitable for curing the adhesive and production of a bonded lignocellulosic composite article.

The adhesive treated lignocellulosic substrate, typically a particulate substrate, is desirably poured onto a screen or similar apparatus that approximates the shape of the final lignocellulosic article. This stage of the process is called forming. During the forming stage the lignocellulosic particles are loosely packed and made ready for hot pressing. A constraining device such as a forming box is typically used in order to prevent the loose furnish for spilling out at the sides. Those skilled in the art will appreciate how to form the adhesive treated particulate substrate in order to achieve the desired thickness in the final compression molded composite product. During the production of compression molded (pressed) boards, such as OSB, the forming operation typically takes place immediately after the adhesive application to the substrate is completed. The final hot pressing of the formed substrate takes place typically within an hour of the forming operation. Desirably, the hot pressing should take place as soon as possible after the adhesive is applied to the substrate, although delays typically occur during industrial practice. It is preferred that hot pressing take place within an 2 hours of adhesive application, more preferably within 1 hour, still more preferably within 30 minutes, even more preferably within 20 minutes. The longer the adhesive remains in contact with the lignocellulosic substrate and exposed to the atmosphere prior to pressing, the greater the extent of pre-reaction of the isocyanate which can occur. The amount of pre-reaction (pre-curing) is a function of time, ambient temperature, and ambient humidity. Each of these factors, as they increase, tend to increase pre-curing. Extensive pre-curing of the isocyanate can interfere with the development of optimal adhesive bonding in the final composite and may result in a composite with poor mechanical properties.

Another embodiment is the construction of wood composites with separate surface and core layers. Oriented strand board, for example, is constructed using two surface layers and one core layer, where the orientation of the surface and core flake length are alternated by 90 degrees. This imparts vital mechanical properties and dimensional stability to the final composite. The surface and core layers may be treated with either isocyanate-based adhesives or PF (phenol formaldehyde resin) type adhesive. The preferred embodiment uses MDI type adhesives in both the surface and core layer.

Once the adhesive treated substrate is formed on a suitable surface, typically a screen or a metal plate known as a caul plate, the formed substrate is moved into a press and compression molded at a press temperature and for a period of time (press residence time) sufficient to provide for the final curing of the adhesive. The amount of pressure applied in the press is sufficient to achieve the desired thickness and shape of the final composite. Pressing may optionally be conducted at a series of different pressures (stages). The maximum pressure is typically between 200 psi and 800 psi, but is more preferably from 300 psi and 700 psi. The total residence time in the press, for a typical OSB manufacturing process, is desirably between 6 seconds per millimeter panel thickness and 18 seconds per millimeter panel thickness, but more preferably between 8 seconds per millimeter panel thickness and 12 seconds per millimeter panel thickness. Pressing is typically accomplished with metal platens which apply pressure behind metal surface plates referred to as caul plates. The caul plates are the surfaces which come into direct contact with the adhesive treated furnish (board pre-forms) during pressing. The caul plates are typically carbon steel plates, but stainless steel plates are sometimes used. The metal surfaces of the caul plates which come into contact with the adhesive-treated lignocellulosic substrate are desirably coated with at least one external mold release agent in order to provide for recovery of the product without damage. External mold release treatments, suitable for press surfaces used in the production of compression molded lignocellulosic articles made from particulate substrates and isocyanate-based adhesives, are well known and their use will be appreciated by those skilled in the art. The use of external mold release is less important when the three layer approach (PF on top, isocyanate-based adhesive in the core) is used, but is still desirable. Non limiting examples of suitable external mold release agents include fatty acid salts such as potassium oleate soaps, or other low surface energy coatings, sprays, or layers.

An important advantage of the reaction system and process, as noted previously, is that press temperatures may be reduced without increasing the press residence time. Preferred press temperatures in the process are in the range of from 300° F. to 400°, more preferably from 325° to 375° F. It is a particularly surprising feature that the same advantage of reduced press temperatures can be achieved even when slower curing PF resin adhesives are used in the surface. This is surprising because PF binders used in the surface layers generally require higher press temperatures when used in the prior art methodology (i.e. when using straight MDI in the core instead of the multi-component isocyanate-based adhesive according to the disclosure).

e) Recovering the bonded lignocellulosic article.

The cured compression molded lignocellulosic composite article is removed from the press and any remaining apparatus, such as forming screens and caul plates, is separated. Rough edges are typically trimmed. The freshly pressed articles are sometimes subjected to conditioning for a specified time at a specified ambient temperature and relative humidity, in order to adjust the moisture content of the wood to a desired level. This conditioning step is optional. In preferred embodiments of the process, the compression molded articles are typically flat boards, such as oriented strand board (OSB). However, the production of compression molded lignocellulosic articles with more complex three dimensional shapes is within the scope of the disclosure.

In a highly preferred manifestation of this process embodiment, the catalyst is pre-mixed with the polyfunctional isocyanate and applied to the substrate as one reactive stream. The hydrophilic polyol is applied to the substrate as a second reactive stream. In the preferred manifestations of the process, the multi-component adhesive is applied to the lignocellulosic substrate as exactly two mutually reactive chemical streams. The streams are most preferably applied to the substrate at the same time, although it is within the broader scope to apply the mutually reactive streams separately in any desired order.

It has been unexpectedly and surprisingly found that the reaction systems and processes facilitate the production of pressed lignocellulosic composites, especially composites formed from a mass of particulate lignocellulosic furnish, at lower press temperatures without an increase in residence time in the press. It has further been found, quite unexpectedly, that the reaction system and process facilitate the production of lignocellulosic composites from relatively high moisture content furnish. Furnish having moisture content greater than 6% by weight can be used, and pressing can be accomplished at press temperatures of 350 F or sometimes even lower. The moisture content of the furnish can be as high as 15 percent by weight, but is desirably in the range of between 8 percent and 14 percent by weight, still more preferably between 9 percent and 13 percent by weight of the total furnish. This greater flexibility in regard to moisture content reduces the need for pre-drying of the furnish. Pre-drying can sometimes be eliminated altogether.

When PF adhesives are used in the surface layer, the furnish that is employed in the surface (PF bonded) layers may still need to be dried to lower moisture levels consistent with the use of the PF adhesive. However, the major portion of the furnish, which goes into the core layer and is bonded with the multi-component adhesive system, may contain higher moisture levels (noted above). Those familiar with the art will appreciate the range of moisture levels in the furnish that is most appropriate for the use of PF resins as adhesives.

The reaction systems and processes disclosed herein are particularly well suited to the production of oriented strand board (OSB). However, the reaction systems and processes can be applied to the production of other kinds of compression molded lignocellulosic composites. These other types of composites include, but are not limited to, medium density fiberboard (MDF), particle board, straw board, rice hull board, plywood, laminated veneer lumber (LVL), and the like.

Molecular weights, equivalent weights, and group functionalities referred to herein are number averaged for polymeric or oligomeric compounds unless stated otherwise. Molecular weights, equivalent weights, and group functionalities for pure compounds are absolute unless stated otherwise. Molecular weights, equivalent weights, and group functionalities for mixtures of pure compounds of the same type are number averaged unless stated otherwise.

The terms "consist essentially of", "consists essentially of", and "consisting essentially of", in the context of the present specification is understood to mean that the composition referred to by the term is free of sufficient amounts any additional species (not specified as being present) to produce a noticeable change in the properties or behavior of the composition that is referred to, relevant to the practice of the invention.

Those skilled in the art will appreciate many possible variations within the scope of this invention. The invention is further illustrated by the following specific examples, which are not to be construed as limiting.

EXAMPLES

Glossary

Polyol A, a glycerol initiated polyether liquid polyol from Huntsman Corporation. This hydrophilic, polyether polyol has an equivalent weight of about 330 and contains greater than 50% by weight of oxyethylene units.

Iso A, a polymeric polyphenylene polymethylene polyisocyanate [PMDI] catalyzed with 90 ppm (based weight basis of Fe) iron acetylacetonate. The polyisocyanate is a mixture of diphenylmethane diisocyanate isomers, and higher (3-ring and up) oligomers of the MDI series. This isocyanate has a free isocyanate (—NCO) group content of about 31% by weight and a viscosity at 25° C. of about 170 cps. It has a number averaged isocyanate (—NCO) group functionality of about 2.7.

Iso B, a polymeric polyphenylene polymethylene polyisocyanate [PMDI] from Huntsman Corp. This isocyanate, which has no added catalyst, is a mixture of diphenylmethane diisocyanate isomers, and higher (3-ring and up) oligomers of the MDI series. It has a free isocyanate (—NCO) group content of about 31% by weight and a viscosity at 25° C. of about 170 cps. It has a number averaged isocyanate (—NCO) group functionality of about 2.7.

EW-58H emulsified wax, produced by Borden Corp. This is a hydrocarbon slack wax emulsified in water.

GP 3121 and GP 3110 RESI-STRAND® liquid phenyl formaldehyde resin binder is used to treat flakes used in the core and surface layers respectively, produced by Georgia Pacific Corp.

Aspen (*populus* sp.) wood flakes prepared at the University of Maine

STONER E497 thermosetting mold release agent, produced by Stoner Inc.

Flake Board Making Procedure:

Wood strands were produced at the Advanced Engineered Wood Composite Center (AEWC) located at the University of Maine in Bangor. Aspen logs were harvested, debarked and delivered in November 2006. Logs were stranded on a Carmanah 12/4s ring strander, run at 638 RPM. Two disposable knives were used having a knife angle of 33° and a (setback) counterknife angle of 70°. Knife projection was set at 0.025", and measured with a dial gage to ensure a tolerance of no more than +/−0.002".

The strands were then dried to the desired moisture contents on a Koch Bros. forced-air conveyor strand dryer, at an approximate temperature of 200° F.

A pre-weighed amount of strands corresponding to either both surfaces or one core was placed within a Coil spinning disk atomizing binder blender. The blender is 6' in diameter, 3' deep and was spun at 15 rpm. The EL-4 spinning disk was spun at approximately 12,000 rpm.

The binder and, where required for, polyol was pumped to the blender on a weight loss basis using a Masterflex peristaltic pump using #24 Tygon tubing. The emulsion wax was applied using a Spraying Systems air atomizer, model ¼ JBC SS with an SU-22 tip, the air pressure set at approximately 20 psi. The binder and wax was introduced at a rate of 110 ml/min, whereas the polyol was added at a rate of 30 ml/min. The lower speed for the polyol was to ensure uniform coverage of a relatively small amount of polyol.

Forming was accomplished using hand lay-up techniques. An 18 gauge, 4'×8' steel caul plate sprayed with STONER E497 thermosetting mold release was placed on top of a ball-transfer lay-up table. A 6"×32"×48" forming wooden forming box was then laid on top of the cauls. A three-layer random-oriented mat was then formed. The forming was then carefully removed and excess strands along the edges placed back on the mat The VOC caul was then placed around the mat (see next section) and a matching caul sheet placed on top. This assembly was then moved to the press.

The VOC collection system used to collect emissions from the press, consisted of a gasketed, picture-frame caul and a VOC vapor collection setup.

The aluminum caul was ¾" thick with ID dimensions of 41"×89" and OD dimensions of 46"×94". The caul had a ¼"×¼" groove, rounded at the corners, machined into the top and bottom surfaces allowing for placement of a 6 mm roundstock, closed cell sponge silicone gasket. The gasket was above the caul surface, ensuring an intact seal even during decompression steps at the end of the press cycle.

For the air inlet system on the closed caul, an external air inlet tube, running from a side portal in front to the center of rear of the frame was used. The rear connection was made through a manifold, sending air from the inlet tube through 5 air inlet holes drilled through the caul This allowed for a sweeping air movement across the panel as the vacuum was pulled from the front. The VOC vapor stream was exhausted through an air outlet system consisting of four ¼" ports drilled into the front of the caul. These ports were connected using Teflon and copper tubing, all leading to one main copper outlet tube. This single outlet tube allowed for quick and easy connection of the Teflon tubing running to the vapor collection system (described below) once the mat assembly was placed in the press.

The methodology to collect the press emission gases are incorporated herein fully by the following reference: Jiang et al, 2002, Forest Products Journal, 52 (11/12): 66-77.

Pressing:

The 32"×48" mats were pressed in a 4'×8' 1800 ton Erie Mill and Press hydraulic hot press. The platens were heated to a target temperature of 350 F.° (177C.°) using two Mokon hot oil heaters, each with two zones. Each platen has 4 embedded fiber optic thermocouples which recorded platen temperature. The programmable logic controller (PLC) controlled press collected position, pressure and platen temperature data at one second intervals and downloaded them to an Excel file. The press was run in position control to a target thickness of 0.719". The press was set to begin its cycle at first contact of the mat with both platens (−5.5"). The first step took 45 seconds to obtain target thickness. That position was held for between 135-240 seconds depending on the treatment. Three decompression steps were then used, each lasting 15 seconds.

When panels were removed from the press, they were labeled and then cut to 32"×80" on a table saw. The panels were then measured for weight, thickness, volume and density. The panels were then hot stacked.

Following panels pressing the panels were conditioned at 21° C. and 41% relative humidity to a final equilibrium moisture content of about 7%. Samples for physical and mechanical properties were cut form the test panels using a predetermined cutting pattern.

Volatile organic compounds (VOCs) were analyzed by several analytical methods. The VOCs were either collected in the water or the methylene chloride trap in the VOC collection train. Three analytical methods were used to identify and quantify the chemical compounds present in the VOC emissions. Gas chromatography/mass spectrometry (GC/MS) was used to determine phenol and benzene present in the methylene chloride. Gas chromatography/flame ionization detector was used to identify and quantify the amount of methanol present in the VOC. Ultraviolet spectrophotometer (UV) was used to determine the amount of formaldehyde present in the water solutions.

Flakeboard panels were pressed according to the aforementioned method. Table 1 describes the panel construction examples that are relevant to the disclosure. All additives are on a parts by weight basis. Table 2 displays the tested panel physical, mechanical, and pressing emission properties for each example described in Table 1.

TABLE 1

Panel making details and panel properties

| Panel Construction Details | Example 1 * | Example 2 * | Example 3 ** |
|---|---|---|---|
| Surface binder/amount | Iso B/4% | GP 3110 RESI-STRAND/8% | Iso B/4% |
| Core binder/amount | Iso B/4% | GP 3121/8% | Iso A/4% |
| Polyol A | 0 | 0 | 0.6% |
| Wax Content | 1% | 1% | 1% |
| Flake Moisture Content Surface/Core | 11/7% MC | 5/5% MC | 13/11% MC |
| Pressing Temperature | 400° F. | 400° F. | 350° F. |

* indicate comparative examples
** indicates an example according to the disclosure

TABLE 2

Flakeboard Panel Physical, Mechanical, and Pressing Emission Properties

| Tested Property | Example 1 * | Example 2 * | Example 3 ** |
|---|---|---|---|
| Internal Bond (psi) | 134 | 23 | 128 |
| Thickness Swell (%) | 4.5 | 7.2 | 5.7 |
| MOR (psi) | 7019 | 4764 | 6588 |
| MOE (psi) | 959226 | 813845 | 924068 |
| Phenol emissions (ppt) | 0 | 11.5 | 0 |
| HCHO (ppt) | 49.6 | 1639 | 10.0 |
| Methanol (ppt) | 11.2 | 88.7 | 10.0 |

As can be seen in Table 2, Example 3 displays improvements in physical and mechanical properties, and a reduction in pressing emissions compared to the liquid phenol formaldehyde (PF) binder in Example 2. Further, Example 3 demonstrates comparable physical and mechanical properties to the 100% MDI bonded panel described in Example 1. Further, these comparable physical and mechanical properties are obtained with a significant reduction in pressing temperature and at higher flake moisture content. Because of this reduction in pressing temperature, formaldehyde emissions and energy to heat the press are significantly reduced in Example 3 (as compared to Example 1). Also, Example 3 demonstrates that it is possible to bond lignocellulosic composites at unusually high flake moisture content to allow for further energy savings and reduced emissions at the dryer.

The following Examples (Examples 4 and 5) display the advantage of adding the polyol separate from the MDI binder. The MDI prepolymer is made by adding 15 pbw Polyol A to 85 pbw Iso A binder. These components were then placed in an oven heated to 60° C. for 12 hour. The resulting prepolymer had and NCO percent and viscosity of about 27 percent and 650 centipoises at 25° C. respectively. The prepolymer Example 5 is shown to demonstrate the advantage of adding the two components separately.

TABLE 3

Panel making details and panel properties

| Panel Construction Details | Example 4 Binder according to Disclosure | Example 5 MDI Prepolymer |
|---|---|---|
| Binder type/amount | 4% Iso A | 4.6% MDI prepolymer |
| Polyol A | 0.6 | 0.0 |
| Wax Content | 1.0 | 1.0 |
| Flake Moisture Content | 10.0 | 10.0 |
| Pressing Temperature (° F.) | 350 | 350 |

TABLE 4

Flakeboard Panel Physical, Mechanical, and Pressing Emission Properties

| Tested Property | Example 4 Binder according to Disclosure | Example 5 MDI Prepolymer |
|---|---|---|
| Internal Bond (psi) | 72 | 55 |
| MOR (psi) | 4465 | 2499 |
| MOE (psi) | 6460119 | 470501 |
| D-5 Durability Test (wet load, lbs.) | 477 | 324 |

A comparison of Example 4 and 5 show improvement in the composite panel properties when using a binder according to the disclosure. Panels made with a binder system according to the disclosure (Example 4) display higher mechanical and durability properties than an equivalent prepolymer, single component system (Example 5).

What is claimed:

1. A process for the production of lignocellulosic composites comprising the following steps:
    (a) providing a lignocellulosic substrate comprising a plurality of lignocellulosic adherends, wherein the lignocellulosic substrate moisture content is greater than 6% by weight;
    (b) spraying a first stream of an adhesive onto the lignocellulosic substrate wherein the first stream comprises a polyfunctional isocyanate and a transition metal organometallic catalyst; wherein the first stream is free of a prepolymer;
    (c) spraying a second stream of the adhesive onto the lignocellulosic substrate wherein the second stream, which is different from the first stream, comprises a hydrophilic organic polyahl having oxyethylene segments that make up greater than 50% of the weight of the polyahl and a non-isocyanate reactive additive; wherein the second stream is free of a prepolymer; then
    (d) forming and pressing the lignocellulosic substrate under conditions suitable for curing the adhesive to produce a bonded lignocellulosic composite article;
    (e) recovering the bonded lignocellulosic composite article; and
wherein the conditions suitable for curing include heating the lignocellulosic substrate to a temperature of from 300° F.-400° F.

2. The process of claim 1 wherein the transition metal organometallic catalyst comprises at least one organic compound of iron.

3. The process of claim 2 wherein the organic compound of iron contains at least one chelating ligand.

4. The process of claim 1 wherein the polyether polyol has an oxyethylene content of at least 70% by weight, a number averaged molecular weight of between 700 and 2000, and is prepared from an initiator having a number averaged functionality of from greater than 2 to 4.

5. The process of claim 1, wherein the conditions include heating the lignocellulosic substrate to a temperature of from 325° F.-375° F.

6. The process of claim 1, wherein the hydrophilic organic polyahl comprises a hydrophilic organic polyol and the transition metal organometallic catalyst comprises at least one metal selected from the group consisting of the metals of Groups IVB, VB, VIB, VIIB, and VIIIB of the Periodic Table of the Elements.

7. The process of claim 6, wherein the hydrophilic organic polyol comprises a polyether polyol and the transition metal organometallic catalyst comprises at least one metal selected from the group consisting of the metals Group VIIIB of the Period Table of the Elements.

8. The process according to claim 1, wherein the non-isocyanate reactive additive is selected from the group consisting of fire retardants, pigments, dyes, antioxidants, light stabilizers, expanding agents, inorganic fillers, smoke suppressants, slack waxes, antistatic agents, internal mold release agents, inert liquid diluents, solvents, biocides, or combinations thereof.

9. A process for the production of lignocellulosic composites consisting of the following steps:
    (a) providing a lignocellulosic substrate comprising a plurality of lignocellulosic adherends wherein the lignocellulosic substrate moisture content is greater than 6% by weight;
    (b) spraying a first stream of an adhesive onto the lignocellulosic substrate wherein the first stream comprises a polyfunctional isocyanate and a transition metal catalyst; wherein the first stream is free of a prepolymer;
    (c) spraying a second stream of the adhesive onto the lignocellulosic substrate wherein the second stream, which is different from the first stream, comprises a hydrophilic polyahl having oxyethylene segments that make up greater than 50% of the weight of the polyahl and a non-isocyanate reactive additive; wherein the second stream is free of a prepolymer; then
    (d) blending the lignocellulosic substrate and the two separate streams of the adhesive to produce an adhesive treated lignocellulosic substrate;
    (e) forming and pressing the lignocellulosic substrate under conditions suitable for curing the adhesive to produce a bonded lignocellulosic composite article having a total adhesive loading between about 1 and about 6% by weight of the bonded lignocellulosic article;
    (f) recovering the bonded lignocellulosic composite article; and
wherein the conditions suitable for curing include heating the lignocellulosic substrate to a temperature of from 300° F.-400° F.

10. The process of claim 9, wherein the lignocellulosic substrate is a multi-layer mat.

11. The process of claim 9, wherein pressing the lignocellulosic substrate comprises a residence time in the press between 8 seconds per millimeter thickness of the lignocellulosic substrate and 12 second per millimeter thickness of the lignocellulosic substrate.

12. The process of claim 11, wherein the polyfunctional isocyanate has a viscosity at 25° C. less than 1,000 cps.

13. The process of claim 1, wherein the second stream is sprayed onto the lignocellulosic substrate before the first stream is sprayed onto the lignocellulosic substrate.

14. The process of claim 9, wherein the second stream is sprayed onto the lignocellulosic substrate before the first stream is sprayed onto the lignocellulosic substrate.

* * * * *